(12) United States Patent
Chen et al.

(10) Patent No.: US 7,221,649 B2
(45) Date of Patent: May 22, 2007

(54) METHOD AND APPARATUS FOR IDENTIFYING DELAY CAUSES IN TRAFFIC TRAVERSING A NETWORK

(75) Inventors: Fei Chen, Green Brook, NJ (US); William S. Cleveland, Summit, NJ (US); Don X. Sun, Warren, NJ (US); Francis X. Zane, New Providence, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 981 days.

(21) Appl. No.: 10/247,899

(22) Filed: Sep. 20, 2002

(65) Prior Publication Data

US 2004/0057379 A1    Mar. 25, 2004

(51) Int. Cl.
*H04J 1/16* (2006.01)

(52) U.S. Cl. .................... 370/235; 370/253

(58) Field of Classification Search ............. 370/389, 370/229, 231, 232, 235, 237, 238, 252, 253
See application file for complete search history.

(56) References Cited

U.S. PATENT DOCUMENTS 4,569,042 A * 2/1986 Larson ............... 370/250
6,757,255 B1 * 6/2004 Aoki et al. ............ 370/252

* cited by examiner

*Primary Examiner*—Brenda Pham

(57) ABSTRACT

A monitoring technique is provided for diagnosing delays in file transfers between a server and a client via a network, which monitoring technique operates to make measurements of ordinary network traffic on a link unique to a given client/server pair connection. In particular, the invention operates to apply a set of rules to partition the file transfer time into increments attributable to specific identified causes. To that end, the invention intercepts and sorts traffic traversing a predetermined monitor point into a set of flows, wherein each flow consists of all of the traffic between one client and one server. For each flow the packet headers and timestamps of all packets passing in each direction are read. The partitioning of the file transfer times is based on the resulting data.

25 Claims, 2 Drawing Sheets

METHOD AND APPARATUS FOR IDENTIFYING DELAY CAUSES IN TRAFFIC TRAVERSING A NETWORK

FIELD OF INVENTION

The invention relates to network traffic flows and more particularly to the determination of delay elements for such traffic flows.

BACKGROUND OF THE INVENTION

In contemporary data networks, data is typically exchanged between a requesting user, usually referred to as a client, and a network computer having an associated local storage means where the requested data is stored, that network computer usually being referred to as a server. Commonly, the flow of data between the client and the server is predominantly in the server-to-client direction. The transfer time for a given increment of data being exchanged via the network is a function of various network and client/server constraints, and may deviate significantly from an ideal transfer time. It is, of course, the user's desire to minimize the network transfer time, so as to receive a requested set of data as soon as possible after initiating the request. That objective similarly holds from the standpoint of the network infrastructure—the sooner a given data transfer is completed, the sooner the network bandwidth dedicated to that request can be reused for another data transfer application. A key consideration in the realization of any performance improvement for a network is knowledge of the source and length of transmission delays that contribute to sub-optimum data transfer times.

While efforts have been made in the art to determine network transfer delay cause and contribution, the necessary monitoring has generally been implemented through instrumentation of the clients and servers, and the transmission of known test messages. In one case known to the inventors, a methodology was suggested for carrying out the monitoring function using actual network traffic data based on a critical path analysis methodology, but that approach applies only to controlled test conditions, rather than existing operational networks. See A. Barford and M. Crovella, "Critical Path Analysis of TCP Transactions," SIGCOMM '00, Stockholm, 2000.

SUMMARY OF THE INVENTION

The invention provides a monitoring technique for diagnosing delays in file transfers between a server and a client via a network, and operates to make measurements of ordinary network traffic, and on a link unique to a given client/server pair connection. In particular, the invention operates to apply a set of rules to partition the file transfer time into increments attributable to specific identified causes. To that end, the invention intercepts and sorts traffic traversing a predetermined monitor point into a set of flows, wherein each flow consists of all of the traffic between one client and one server. For each flow the packet headers and timestamps of all packets passing in each direction are read. The partitioning of the file transfer times is based on the resulting data.

The partitioning process begins by separating a connection into segments performing specific tasks, such as establishing the connection or transferring a specific piece of data. Each segment is divided into intervals based on the arrival of designated packets. The time taken by that interval is then divided among various causes of delay based on information about the packets in that interval together with the type of segment (e.g., connection-establishment) taking place. This is done by applying a specific set of rules to the data. A further embodiment is also described that operates to obtain a more refined analysis of the delays in the network by accumulating information over many connections. The information so obtained is then used to produce a model of the transmission process. From this model, network delays are analyzed by comparing the observed data to the model. A still further embodiment is addressed to the circumstance of the monitor recording some traffic to which the analysis methodology of the invention does not apply. For that circumstance, a method is described for identifying and removing this non-compliant traffic before processing.

DETAILED DESCRIPTION

The invention is directed to an improved method for identifying causes of delay in network data transfer applications. At the time of the invention a substantial proportion of network data transmission is based on the use of the HTTP transfer protocol, a protocol used by the World Wide Web to retrieve information from distributed servers interconnected via the Internet, and the use of Transport Control Protocol (TCP) as the transport layer protocol. Accordingly, the method of the invention will hereafter be described in terms of an HTTP/TCP network environment, but it should be apparent to those skilled in the art that the principles of the invention are equally applicable to other network environments.

Figure 1:
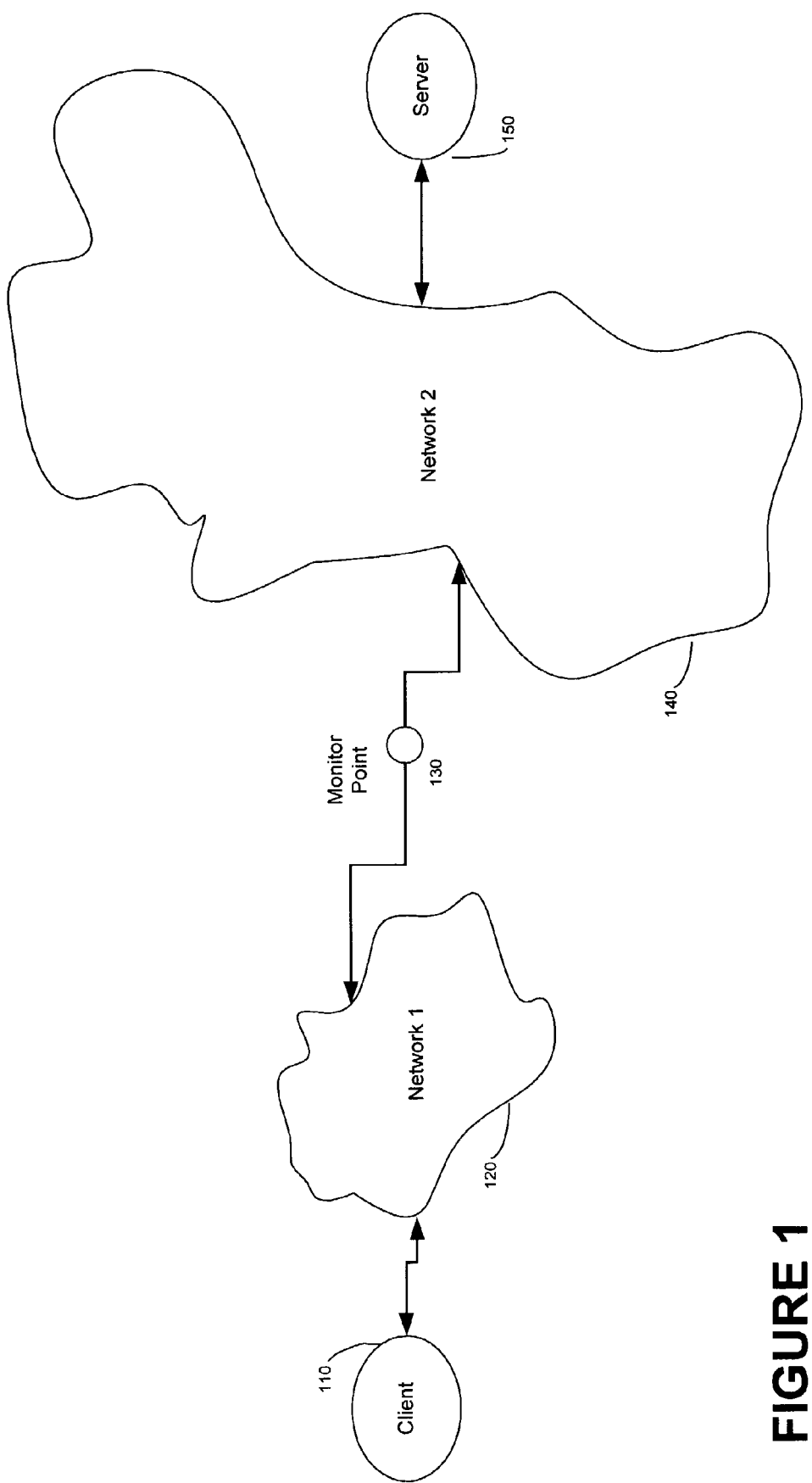
FIG. 1 provides a schematic view of an exemplary network configuration for the practice of the method of the invention.

An illustrative network configuration for practice of the method of the invention is depicted schematically in FIG. 1. As shown in the figure, an exemplary Client 110 is interconnected with an exemplary Server 150 via a first Network 120 and a second Network 140. In a typical application, Network 1 (to which the client is directly connected) represents a corporate or campus intranetwork, or possibly an ISP network for an individual user, and Network 2 represents the larger Internet. [Note that Server 150 might also be connected to the Internet (Network 2) via a subnetwork, but that level of detail is not necessary to the explanation of the working of the invention.] At an intermediate point of a connection between Network 1 and Network 2 is a Monitor Point 130 at which data is extracted for analysis according to the method of the invention. As will become apparent from the further discussion of the invention herein, the location of the Monitor Point depicted in FIG. 1 is merely illustrative. Numerous other points between the client and the server could also be selected as an appropriate data extraction point for the method of the invention.

In accordance with the HTTP/TCP protocols, a data transfer transaction is begun by a request from the Client to the Server for a connection, that request being acknowledged by the Server, and a connection is established between the Client and the Server via Network 1 and Network 2. The Client then sends a request to the Server via that connection for an identified data file. The Server responds by sending the contents of the requested file to the Client, and traffic continues to flow via that Client/Server connection until the request is satisfied. [It is to be noted the term "client," as used herein, is intended to connote a network entity that initiates a request and the term "server" is intended to connote a network entity that transfers some quantity of data, normally in response to a request. Thus, at a given time, either the client or the server as illustrated in the figure could function as the opposite entity.]

The transfer of information between the server and the client consists of data packets moving back and forth across the connection. As those packets travel past the Monitoring Point 130, they are monitored by the invention. Specifically, the packet headers are monitored, a timestamp is added, and the header and its associated timestamp are processed according to the method of the invention. It should be understood that the Monitor Point 130 shown in FIG. 1 is established in respect to a physical path between Network 1 and Network 2 and accordingly monitors multiple traffic streams using that physical path between given Client/Server pairs (such streams typically constituting virtual paths or virtual connections). Each traffic stream between a particular Client and the Server with which it is presently in communication will be referred to herein as a "connection."

The monitoring of packets at the Monitor Point is related to the flow control characteristic of TCP—i.e., in many cases under TCP, certain packets cannot be sent until other packets are received. A simple example is in opening the connection, where the client sends a SYN, the server waits for a SYN and then sends a SYN/ACK; similarly, the client waits for a SYN/ACK and then sends an ACK. In transferring data, for flow control reasons, TCP only allows the server to have a limited number of packets outstanding at one time (i.e., sent by the server, but not yet acknowledged by the client).

Because of this dependency—i.e., a happens, then b—the invention is able to extract connection timing information from the single Monitor Point. In (idealized) normal operation, one should see bursts of data packets from the server separated by one Round Trip Time (RTT). This delay is needed for the ACKs to propagate back to the server, so that it knows that it is allowed to send more packets. From this, delays of more than one RTT or missing client ACKs provide usable information about non-ideal behavior.

Figure 2:
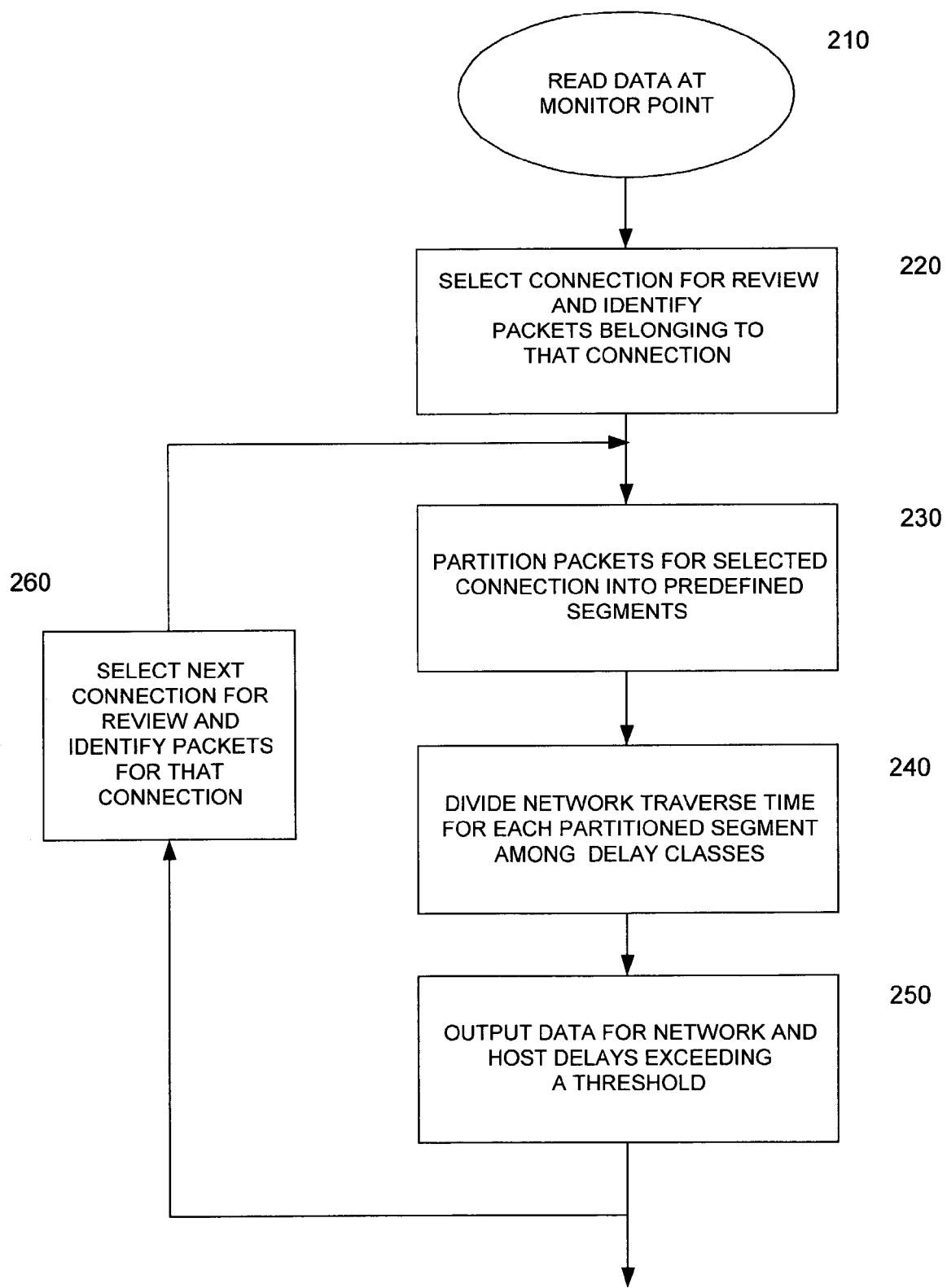
FIG. 2 shows a flow chart for the method of the invention.

The invention will be hereafter described in conjunction with FIG. 2, which provides a high-level flow chart for the methodology of the invention. With reference to that figure, the invention begins, at step 210, by reading data at the Monitor Point in respect to data packets traversing that point. As noted above, packets read at the Monitor Point during a given time interval will typically represent a plurality of Client/Server connections using the physical path in which the Monitor Point is located. Because the invention is addressed to the determination of time delays on a connection-specific basis, it is necessary that the monitored packets be identified according to the connection they belong to. For the preferred embodiment, such connection-identification is made based on header information associated with each monitored packet, but any method known in the art for making such an identification is intended to be within the contemplation of the invention.

The method of the invention next proceeds, at step 220, to select a given connection for analysis of time delays associated with that connection. Having selected that connection, all packets identified with the selected connection during a time interval under consideration are subjected to further analysis according to the invention. To facilitate that analysis, the invention proceeds, at step 230, to a partitioning of the packets associated with the selected connection into a set of predefined segments. In the preferred embodiment, each connection is partitioned into a sequence of three segments:

An initial Connection Open Segment;
One or more Data Segments; and
a final Connection Close Segment.

Those segments are defined as follows.

The Connection Open Segment begins when the Client sends a SYN packet initiating a TCP connection with the Server, and ends when both sides have sent ACKs acknowledging receipt of a SYN packet for this connection. The Connection Close Segment begins when either side sends a FIN or RST packet, and ends when the last packet is seen from this connection.

The packets in each Data Segment are a sequence of one or more data packets sent from the Client to the Server followed by one or more data packets from the Server to the Client. In such a segment, the data packets sent from the Client to the Server are called the Request, and the subsequent data packets from Server to Client are designated as the Response. A Data Segment is defined to begin at the time at which the last packet of the preceding segment arrived (i.e., a Data Segment includes the time immediately preceding it back to the end of the previous packet). A Data Segment ends when the next packet would be either a data packet from the Client to Server (indicating the start of another Data Segment) or a FIN/RST (indicated the start of the Connection Close Segment). The Request ends and the Response begins at the time that the first data packet from server to client in this segment arrives.

Once the packets of a connection have been partitioned into segments, as described above, the invention proceeds, at step 240, to apportion the network transmission time for the packets in each segment among a set of delay causes. For the preferred embodiment, that set of delay causes is based on the proportion of total network transmission time for a packet attributable to: Server Network, Client Network, Server Host, Client Host, and Excess—the Excess parameter representing time that the connection is open but not in use. In that preferred embodiment, Server and Client Network times are further divided into Propagation and Congestion components, where propagation represents the best-case performance attainable on an unloaded network, and congestion represents the variable overhead seen as traffic fluctuates on a real network. The propagation time can also be seen as the portion of the connection Round Trip Time (RTT), as that term is understood in the art for HTTP/TCP connections, associated with the Server Network or the Client Network. The "RTT" term will be used from time to time herein to refer to the propagation time for a given network component, and it is to be understood that such term refers to the portion of total connection RTT associated with the given network component. In the preferred embodiment, the value of RTT will be taken as the minimum value of network transmission time observed over a reasonable number of connections for the network component(s) under consideration.

Hereafter, the process is further described by which the invention allocates time among the various delay causes for each of the segments defined above. In considering the described allocations, it should be understood that the "length" of a segment or interval under consideration is determined as the difference between the timestamps that begin and end the segment/interval. It is also noted that if one takes the time period that the connection is open, divides it into non-overlapping intervals, and then assigns each interval to a cause, this has the effect of partitioning the total time taken by the connection among these causes.

I. Connection-Open/connection-Close Segments (a) Connection Open Segment:

For the Connection Open segment, the time period between the observation at the Monitor Point of the Client SYN packet and the observation of the SYN/ACK response from the Server is assigned entirely to the Server network delay cause. Correspondingly, the time period between the observation at the Monitor Point of the Server SYN/ACK response and the observation of the Client ACK is assigned entirely to the Client network delay cause. Each of these time periods is then further divided between propagation time and congestion time. In the preferred embodiment, up to 1 server or client RTT, respectively is assigned to propagation time and any remaining time is assigned to congestion.

(b) Connection Close Segment:

The entire time period for the Connection Close segment is assigned to the Excess delay cause—i.e., additional time that connection is open.

II. Data Segments

For Data Segments, the Request and Response phases are analyzed separately.

(a) Data Segment (Request):

The time period from the start of the Data Segment ("Segment start") to the time of observing the first request packet is assigned to the Client host delay cause if the segment under consideration is the first data segment in the connection or to the Excess delay cause if otherwise.

Assignment of the time intervals between the first request packet and the last request packet can be done in several ways. A basic approach is to simply assign all such intervals to the Client Host delay cause. However, it is believed that the utility of the methodology will be improved by assigning all times up to one Client RTT to the Client Network cause, with the remaining times being assigned to the Client Host delay cause. While either of these techniques will provide a simple but effective estimation in the commonly-occurring case where the request has a very small number of packets, the rare case that the request has many packets presents an added complexity. In that case, it becomes desirable to treat even the request as a significant data transfer in order to appropriately account for the effects of packet loss and congestion. To accomplish that objective, the techniques for analyzing the Data Response segments described in the next section can be applied with the roles of client and server reversed.

(b) Data Segment (Response):

The analysis of time delay during the Response is relatively more complicated than analysis of other segments. To accommodate that complexity, the time following the first response packet is handled separately from the time up to that first response packet.

The time period between the Response Start (i.e., the observation time of the last Request packet) and the first response packet is assigned to a combination of the Server network delay cause and the Server host delay cause. To apportion the time in this time period between these two delay causes, two approaches are available. The first, and somewhat simpler approach, is to assign the lesser of total measured time (for this time period) and server network RTT to the Server network delay cause, with any excess time assigned to the Server host delay cause.

In some situations, a more sophisticated approach based on the server ACKs can be employed. A server that sends ACKs immediately in response to a client request implements an immediate-request-ACK policy. Some other servers, implementing a delayed-request-ACK policy, will not acknowledge immediately, but instead either carry the acknowledgement on the first data packet or wait for some timeout before sending an ACK. For an immediate-request-ACK server, the transmission of the ACK conveys information about when the server received the request, allowing the partitioning of the time between network and server delay more accurately. If the server implements this immediate-request-ACK policy, the time from the client request to the server ACK is assigned to network propagation, and any remaining time is assigned to server delay.

Determining whether a server implements an immediate-request-ACK or a delayed-request-ACK can be done by accumulating data from several connections. For each connection, a server RTT time is computed by subtracting the server ACK time from the client request time. If this is sufficiently close to the round trip time (for example, if the median server RTT time is within 5% of the median RTT time), then the server is determined to have an immediate-request-ACK policy.

For that case of the Server not implementing an immediate-request-ACK policy, the simpler apportionment approach described above would be followed. That is, the lesser of total measured time (for this time period) and server network RTT is assigned to the Server network delay cause, with any excess time assigned to the Server host delay cause.

Because the time period between the first Response packet and the end of the Response can be of widely varying lengths, the invention partitions that period into smaller units, called intervals, and treats each interval separately. An interval is the period of time between successive data packets (treating retransmissions as separate data packets, as well as the beginning and end of the Response phase)

Each interval is then classified according to the following criteria:

Interval Length: The length of the measured interval is categorized as belonging to one of three predefined time increments: (1) a time period approximately equal to 1 server network RTT (hereafter abbreviated as "≈RTT"); (2) a time period significantly more than 1 RTT (hereafter abbreviated as ">>RTT"); or (3) a time period significantly less than 1 RTT (hereafter abbreviated as "<<RTT"). For the preferred embodiment, the time increment "≈RTT" is defined to mean 1 RTT±25%, and the increments >>RTT and <<RTT are defined to mean to mean larger or smaller, respectively, than the approximately-equal window.

Order: The packet ending the interval is classified as being either out-of-order (meaning that its sequence number is not the highest seen thus far) or in-order. If the packet has the same sequence number and length as an already-seen packet, then it is noted to be a retransmission.

ACKs: First, if the interval contains an ACK, the location of the first ACK received in the interval is classified as ≈RTT, >>RTT or <<RTT from the packet ending the interval; the absence of an ACK in the interval is also noted. Second, if the ACKs from the client during the interval under consideration signal a decrease in the window size below some threshold, such as one packet, then a window size change is noted. Third, if there is a triple duplicate ACK used by fast retransmit TCP implementations, this is noted as well.

Based on these classification data, the time of the Response intervals is apportioned among the delay causes in the following manner.

First, all out-of-order Response packets having an interval length of >>RTT are assigned to the Server network delay cause. All remaining Response packets are also assigned to the Server network delay cause, subject to two exceptions:

(1) If the interval length is >>RTT and the ACK location is ≈RTT, the interval time is assigned to the Client network delay cause (because the late Client ACKs result in delayed transmission). and (2) If a Window Size Change is detected, the interval time is assigned to the Client network delay cause (because the Client is preventing the Server from sending data at the maximum allowed rate).

For intervals assigned to the Server or Client network delay causes, interval lengths of ≈RTT or <<RTT are ascribed to network propagation. All longer intervals are assigned to network congestion. For the preferred embodiment, the interval assigned to network congestion will be that portion of an interval that exceeds one ≈RTT. However, in an alternate embodiment, the entire interval length for intervals longer than RTT may be assigned to network congestion.

In an alternative embodiment, for intervals corresponding to retransmitted packets, a somewhat better classification can be obtained by determining whether the original packets were lost in the Server or Client networks.

In furtherance of this additional embodiment of the method of the invention, the following criteria are noted for each interval corresponding to a retransmission of an earlier packet:

Gap: If there are any bytes with sequence numbers preceding the retransmitted packet, then there is a gap, and the packet is labeled accordingly.

Covering ACK: If there is an ACK which has a sequence number greater than the last bytes of the retransmitted packet, then this packet is covered, and is so labeled.

Using those criteria, the retransmitted packet intervals are then evaluated in the following manner. If a gap exists, then ACKs convey no information about the state of the retransmitted packet under consideration, and it is treated simply as an out-of-order packet and assigned a delay cause as previously described. In the cases where no gap exists, if the packet is covered by an ACK, then the client is known to have received the original of this retransmitted packet (since it has acknowledged it). The problem that led to the retransmission of the packet is that this ACK was lost in the server network. According, the delay associated with the retransmission is assigned to server network congestion. For retransmitted packets not covered by an ACK, either the previous transmission of this packet was lost between the monitor and the client, or its ACK was lost between the client and the monitor. In either case, the cause of the delay is congestion in the client network.

In a further alternative embodiment, a methodology for allocating data segment time delay is provided that is expected to produce more accurate estimates, but requires aggregating information together from many connections. This alternate-embodiment methodology operates by computing a lower boundary, which for each transfer size gives the best possible transfer time given the existing network. The total network time for a connection (congestion+propagation) can then be re-divided using this more detailed analysis—i.e., for a given transfer size, all time taken up to this lower boundary is counted as propagation, and any remaining network time is assigned to congestion.

This lower boundary is computed by fitting the details of the observed connections to an abstract model of TCP behavior. This process has several components:

minRTT: Each connection to the server has an observed RTT time. Because the focus here is best-possible performance, minRTT is taken to be the minimum of these RTTs.

slow-start: Different implementations of TCP on different operating systems behave in different ways, and in order to determine what the best-possible behavior is for a given connection, information is needed about the properties of the TCP implementation. Of particular interest is the way the server behaves during its slow-start phase. During TCP slow-start, the server sends some data and waits for acknowledgments confirming that this data has been received. Having received those acknowledgments, the server knows that it is not overloading the network, and so has the right to send more data (usually, twice as much data) in the next round. This continues until congestion is detected, for example, by packet loss in the network. Because of this mechanism, the transfer time, even under ideal circumstances, depends both on the RTT and on the decisions by the server regarding how much data to send.

For each connection, the methodology computes:

numRTT=data transfer time/minRTT, rounded to the nearest integer, and numPackets=number of bytes/maximum segment size (where maximum segment size is the maximum allowable packet size for that connection, given in the TCP packet headers)

Then, for each i from 1 up to some small value N (such as 16), a parameter R(i) is computed as the number of round trip times needed for the server to send i packets of data. To compute R(i), one looks at all connections which send i packets, and sets R(i) to the most frequently occurring value of numRTT for these connections.

From this, the slow-start lower boundary curve S(x), representing the best-possible transfer time for x bytes, is determined as:

number of bytes/maximum packet size×R(i)×minRTT.

An enhancement to this methodology can be made based on the fact that the main split among TCP implementations is whether the initial number of packets sent is 1 or 2. With this enhancement, as described hereafter, these two cases can be differentiated using less data than is required for the general method described above. Following the doubling rule used in TCP slow-start, the two cases involve a sequence of 1,2,4 or 2,4,8 packets being sent in the first three rounds. In particular, 2 packets will be sent in two rounds in the first case but one round in the second, and 4,5, or 6 packets will be sent in three rounds in the first case but two in the second. Based on this, the methodology computes the differences:

numRTT−1, for 2 packet transfers, and numRTT−2, for 4,5,6 packet transfers.

The starting number of packets is then determined to be 1 if the fraction of 2, 4, 5 and 6 packet transfers with difference greater than 0 exceeds some threshold (such as 0.05) and 2 otherwise. The slow start lower boundary S(x) is then determined as:

ceiling($\log_2$(numPackets+1))×minRTT, if the initial number of packets is 1, and $$\text{ceiling}(\log_2(\text{numPackets}+2)-1) \text{ times minRTT otherwise,}$$

where numPackets=x/maximum packet size.

In addition to the limits of the TCP protocol, the network between the client and the server may have a limited bandwidth. By estimating this bandwidth b, another bound on the best-possible performance can be obtained. A transfer of x bytes at b bytes/sec requires at least x/b seconds. Thus, given a bandwidth b, $B(x)=b*x$ is a lower bound on the time needed to transfer x bytes.

The bandwidth b is estimated by accumulating data from several connections. For example, for all servers which see a sufficient number of sufficiently large connections (e.g., 20 connections with more than 10 packets of data), the methodology of the invention generates pairs $(x,T(x))$, where x is the number of bytes transferred in the connection and $T(x)$ is the data transfer time taken. For each connection, the bandwidth $x/T(x)$ is computed for that connection. The bandwidth seen by an individual connection should be at most the true bandwidth, so by taking the maximum bandwidth seen by a connection, an estimate of the true bandwidth b is obtained.

However, a modification to this basic method is needed to make it more robust against measurement errors and outliers. First, rather than using the maximum per-connection bandwidth, a more robust estimator, such as the 98th percentile of per-connection bandwidths, should be used. Second, the number of bytes transferred in the data segment, x, should be modified to exclude the first packet of data (i.e., replace x by x-(packet size) in the above calculations), since the bandwidth of a single packet is undefined. Finally, this simple estimation procedure can produce anomalous results for short connections. To deal with this, only connections which transfer sufficiently large amounts of data (eg, 10 packets) should be used.

The final lower boundary used by this alternative embodiment is then the maximum of the slow-start $S(x)$ and bandwidth $B(x)$ curves, and this lower boundary is then used to determine the allocation among propagation and congestion—i.e. time up to lower boundary allocated to propagation and remaining time allocated to congestion.

The methodology described herein for processing and analyzing HTTP connections will normally be given a sequence of packet headers collected by monitoring traffic on TCP port 80, which is designated for HTTP traffic. However, in many real-world situations, this process will also collect other traffic, either non-HTTP traffic or applications other than web browsing which are being run over HTTP. This arises in practice in several situations—for example, applications designed to work around firewalls often use TCP port 80 since firewalls often allow TCP port 80 traffic to pass through. If the application involved, unlike web browsing, is not transferring data as fast as the network permits, then the use of such sub-optimum transfer data is likely to skew an examination of network performance using the method of the invention.

To deal with this problem, an additional step may be included in which connections that do not comply with the network optimization traffic model are filtered out. As explained below, such filtering is addressed to the two main indicators for this non-compliant traffic: periodicity and small packets.

Periodicity: Many of the non-compliant applications transfer small amounts of data at regular intervals (e.g., stock ticker updates). Furthermore, the intervals are normally integral numbers of seconds. To test a connection for periodicity, the methodology computes the inter-arrival times between successive data packets (i.e., the lengths of the intervals in the data transfer phase). The invention then bins the times by discretizing them to a specific scale—e.g., bins are created corresponding to 0 sec, 0.25 sec, and so on, and each time is rounded to the nearest 0.25 sec and placed in the appropriate bin. The connection is deemed to be periodic, and thus non-compliant, if after this rounding, there is any bin which a) is above some threshold (e.g., corresponds to at least 0.5 seconds) and b) contains many of the times (e.g., at least ⅓ of them).

Small packets: Small packets (i.e., packets of less than maximum size) normally occur as the last packet of a segment whenever the number of bytes to be transferred is not divisible by the maximum packet size. However, some applications slow down during the transfer, and begin the transfer of data at much slower rates. To deal with this case, the methodology identifies all intervals in a segment for which the packet that ends the interval a) is not the last packet of the segments, and b) has less than the maximum segment size. If the fraction of time spent in these intervals exceeds some threshold, such as 0.1, then the connection is deemed non-compliant.

Upon completion of the segment delay analyses for a given connection, as described above, data representing network and host delays exceeding a predetermined threshold are output, at step 250, to an external application established to apply such results for any remedial action required. At the same time, the invention proceeds back to step 230 for analysis of another connection for which data is extracted at Monitor Point 130, and continues to iteratively repeat that loop-back process until all connections using the physical link monitored at Monitor Point 130 have been analyzed.

Potential applications for monitor data output from the invention include:

Service-Level Agreement monitoring: A service provider could offer guarantees to its customer regarding its quality of service based on this methodology. This approach permits these guarantees to be expressed in performance terms the customer understands and cares about (e.g., small congestion delays) rather than lower-level network data (e.g., number of packets lost) as is currently done.

Network operations and provisioning: A provider of network or hosting services can use the data output from the invention to determine whether an acceptable performance level has been achieved, and if not, identify which components of the system need to be improved (e.g., should more servers or more network capacity be obtained). In addition, performance information can be provided to clients of such a provider in order to satisfy these clients that they are receiving good service.

More generally, the output of the invention will also go to a report generation system that provides the owner or operator of the network with information about its status and performance.

It is to be noted that the foregoing discussion of the analysis method of the invention is directed to actual measurement of network transmission times between the Monitor Point and the Server Host (via the Server network), with times attributable to the Client Host or the Client network being inferred from characteristics of the measured data. This Server-Host centered measurement approach should be considered the preferred embodiment of the invention. However, it should be apparent that the method of the invention is equally applicable to a Client-Host centered measurement approach.

At presently available levels of processing power and dynamic memory, it is believed that connection-delay data processed according to the method of the invention will be more effectively handled by an off-line processing facility. However, it is also possible to perform this analysis online. An exemplary embodiment of such an on-line processing approach is described below.

For such on-line processing, the monitoring device would maintain a table of currently active connections. For each connection, the monitor stores some summary information describing the connection as a whole (such as RTT, highest sequence number seen, etc) together with accumulated time allocated to each delay cause. In addition, it stores detailed information for one previous packet, the last data or SYN packet seen.

When a new packet arrives at the monitoring device, it first finds the table entry corresponding to this connection, initializing a new entry if none exists. Now, this new packet and the stored previous packet for this connection define an interval. This interval is analyzed as described earlier, with the parameters needed for this analysis, like RTT, being obtained from the summary information in the table entry. The result of this analysis is a partition of the time from this interval among the delay causes. For each delay cause, the time due to that cause for this interval is added to the accumulated time for each delay cause stored in the record. Finally, the summary information for this connection, like highest sequence number seen, is updated to reflect this new packet.

When the connection is closed by FIN or RST, or has been inactive for some time, the monitoring device outputs the accumulated delays, by cause, for the connection.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention and is not intended to illustrate all possible forms thereof. It is also understood that the words used are words of description, rather that limitation, and that details of the structure may be varied substantially without departing from the spirit of the invention and the exclusive use of all modifications which come within the scope of the appended claims is reserved.

The invention claimed is:

1. A method for identifying delay causes in a network established to provide connections between a first plurality of Clients and a second plurality of Servers, and wherein data is transmitted in said network via packets, said method comprising the steps of:
   providing a Monitor means in said network operable to read and output header data for packets in a multiplicity of said Client-Server connections;
   selecting a given connection from said multiplicity of connections and identifying packets belonging to said given connection based on data outputted by said Monitor means;
   measuring a transmission time in said network for ones of said identified packets; and
   determining an amount by which said network transmission time of said ones of said identified packets exceeds a threshold amount, wherein said threshold amount is related to a nominal transmission time for said identified packets.

2. The method of claim 1 wherein a time stamp is applied to said ones of said identified packets.

3. The method of claim 2 wherein said measured network transmission time is determined as a difference between time stamps for selected pairs of said ones of said identified packets.

4. The method of claim 1 wherein said determining step includes a substep of:
   allocating said network transmission time for said ones of said identified packets among a set of identified delay causes.

5. The method of claim 4 wherein said identified packets are partitioned into ones of a set of predefined segments and said determining step is carried out on a segment by segment basis.

6. The method of claim 5 wherein said predefined segments include a connection-open segment, a connection-close segment and one or more data segments.

7. The method of claim 4 wherein said set of identified delay causes include delay attributable to a sub-network serving said Client, said Client host, a sub-network serving said Server, said Server host, and an Excess parameter representing time that a connection is open but not in use.

8. The method of claim 1 wherein said threshold amount in said determining step is approximately equal to an RTT for a network portion traversed by a given identified packet.

9. The method of claim 1 wherein said threshold amount in said determining step is established as a function of an ideal transfer time for said network.

10. The method of claim 9 wherein said ideal transfer time is determined in relation to a TCP slow start boundary curve.

11. The method of claim 9 wherein said ideal transfer time is determined in relation to a maximum of a TCP slow start boundary curve and a network bandwidth limit curve.

12. The method of claim 1 wherein amounts of network transmission time determined to exceed said threshold amount are classified as being caused by network congestion.

13. The method of claim 12 wherein network transmission time amounts classified as being caused by network congestion are output, along with identification of ones of said packets associated with said transmission time amounts, to a user process.

14. The method of claim 1 including the further steps of:
   identifying connections accessed by said Monitor means that are characterized by a sub-optimum packet transfer rate; and
   marking said connections for non-selection by said selecting step.

15. In a network established to provide connections between a first plurality of Clients and a second plurality of Servers, and wherein data is transmitted in said network via packets, a system for identifying delay causes comprising:
   monitor means in said network operable to read and output header data for packets in a multiplicity of said Client-Server connections;
   selection means for selecting a given connection from said multiplicity of connections and identifying packets belonging to said given connection based on data outputted by said Monitor means;
   timing means for determining a network transmission time interval for ones of said identified packets; and
   computing means for determining an amount by which a network transmission time of said ones of said identified packets exceeds a threshold amount.

16. The system of claim 15 wherein said timing means includes a time stamp applied to said ones of said identified packets.

17. The system of claim 15 wherein said computing means further operates to allocate said network transmission time for said ones of said identified packets among a set of identified delay causes.

18. The system of claim 17 wherein said set of identified delay causes include delay attributable to a sub-network serving said Client, said Client host, a sub-network serving said Server, said Server host, and an Excess parameter representing time that a connection is open but not in use.

19. The system of claim 15 wherein said threshold amount is approximately equal to an RTT for a network portion traversed by a given identified packet.

20. The system of claim 15 wherein said threshold amount is established as a function of an ideal transfer time for said network.

21. The system of claim 20 wherein said ideal transfer time is determined in relation to a TCP slow start boundary curve.

22. The system of claim 20 wherein said ideal transfer time is determined in relation to a maximum of a TCP slow start boundary curve and a network bandwidth limit curve.

23. The system of claim 15 wherein amounts of network transmission time determined to exceed said threshold amount are classified as being caused by network congestion.

24. The system of claim 23 wherein network transmission time amounts classified as being caused by network congestion are output, along with identification of ones of said packets associated with said transmission time amounts, to a user process.

25. The method of claim 15 further comprising:

means for identifying connections accessed by said monitor means that are characterized by a sub-optimum packet transfer rate; and means for marking said connections for non-selection by said selection means.

* * * * *